(12) United States Patent
Sullivan (10) Patent No.: US 8,356,579 B2
(45) Date of Patent: Jan. 22, 2013

(54) DOG TRAINING COLLAR WITH INTERCONNECTING LINKS

(76) Inventor: Don E. Sullivan, La Quinta, CA (US)

( * ) Notice: Subject to any disclaimer, the term of this patent is extended or adjusted under 35 U.S.C. 154(b) by 750 days.

(21) Appl. No.: 12/407,776

(22) Filed: Mar. 19, 2009

(65) Prior Publication Data

US 2009/0235874 A1 Sep. 24, 2009

Related U.S. Application Data

(60) Provisional application No. 61/070,409, filed on Mar. 21, 2008.

(51) Int. Cl.
*A01K 27/00* (2006.01)
(52) U.S. Cl. .......................... 119/862; 119/863; 119/864
(58) Field of Classification Search .................. 119/760, 119/765, 815, 855, 858, 862, 863
See application file for complete search history.

(56) References Cited

U.S. PATENT DOCUMENTS

| | | | |
|---|---|---|---|
| 3,872,883 | A | 3/1975 | Herbert |
| 5,647,303 | A | 7/1997 | Deioma |
| 6,481,384 | B2 | 11/2002 | Jacobs |
| 6,606,967 | B1 | 8/2003 | Wolfe, Jr. et al. |
| 7,107,941 | B2 | 9/2006 | Wang |
| 7,267,082 | B2 | 9/2007 | Lalor |

OTHER PUBLICATIONS

Int'l Application No. PCT/US2009/037906: Written Opinion of the Int'l Searching Authority, dated Nov. 20, 2009, including the Int'l Search Report (Total 6 pages).

*Primary Examiner* — Son T Nguyen
(74) *Attorney, Agent, or Firm* — Law Offices of Kamran Fattahi (57) ABSTRACT

A dog training collar includes a plurality of releasable interconnecting links connected together to form a string of links having opposite ends with a tensioning member connected between the opposite ends of the link string to form a collar. A releasable fastener is included that releasably connects between the tensioning member and at least one of the opposite ends of the link string. The interconnecting links each include an inner side and outer side where the inner side includes a pair of v-shaped protrusions extending away from the inner side. The string of links having a plurality of v-shaped protrusion pairs forms two columns of links arranged in spaced apart relation extending from the inner sides, whereby the string of links is placed around a neck of a dog with said v-shaped protrusions directed toward the neck and connected to said tensioning member by the releasable fastener to form said collar such that adjustment of said tensioning member during wear causes a physical correction to be applied to the neck. The number of links used may be adjusted according a dog's neck size. An anti-tangling device is coupled to the tensioning member whereby the anti-tangling device restores unintended twists in the collar when applied to the neck of the dog.

22 Claims, 9 Drawing Sheets

DOG TRAINING COLLAR WITH INTERCONNECTING LINKS

CROSS-REFERENCE TO RELATED APPLICATION(S)

This application claims the benefit of co-pending U.S. provisional application Ser. No. 61/070,409 filed on Mar. 21, 2008, which is incorporated herein by reference.

BACKGROUND OF THE INVENTION

1. Field of the Invention

This invention relates generally to an improved dog collar, and, more particularly, to an improved dog training collar with interconnecting links.

2. Description of the Related Art

There have been numerous types of collars sold as training devices for dogs, yet few have proven to effectively create lasting change in the dog's behavior. Many collars of late have focused on a passive approach to training that in essence is void of any true corrective qualities.

A collar with traditional dog training qualities currently on the market is known as a Pinch or Prong collar. The Pinch collar is generally an all-metal collar. But there are drawbacks to the Pinch collar.

One drawback is that the chain-like links of such a Pinch collar are non-removably inter-linked or very difficult to remove and reconnect due to the inflexible properties of the metal it is made from. Many older or very young people may have a very difficult time removing or attaching such links.

With another drawback, Pinch collars with removable links may be very confusing to put together. One issue causing such confusion is that many people end up with links facing opposite directions as the orientation of the collar may change while a person installs links. Upon trying to correct this situation, a person can end up having completely reversed a portion of the connecting chain, leaving the proper connecting ring twisted by at least 180 degrees in the wrong position, further causing confusion and incorrect operation of the collar.

Yet another drawback is that, when applying the collar to the dog's neck many people inadvertently twist the bottom connecting chain, which causes the Pinch collar to be tighter that is should be around the dog's neck possibly endangering the dog by restricting airflow. This also causes the Pinch collar to not work properly by disconnecting the function of the connecting chain. When the chain-connecting piece is rolled over or twisted it cannot smoothly slide through the end holes of the row of linked prongs.

Finally, there is a drawback of a prominent social stigma to being seen using a pinch collar and even a standard metal choke chain. Most people will comment that the Pinch collar looks like a medieval torture device. It is these knee-jerk reactions to the visual appearance of the pinch collar that will cause many people not to ever try the collar on their dog for training purposes.

There have been attempts to improve upon the traditional metal Pinch collar, by way of example, a collar formed from a plurality of interconnecting collar elements having substantially plastic components. While fit for its intend purpose and while addressing some of the drawbacks to a traditional pinch collar, such a collar does not address all of the drawbacks. For example, and not by way of limitation, such a collar does not address the issue of twisting the collar when putting the collar on the dog. Furthermore, such a collar relies upon routine engagement and disengagement of the interconnecting elements for putting on and taking off of a dog's neck. The result is that unnecessary wear of plastic portions of the interconnect may occur from extended use over time. Furthermore, some people may experience confusion and difficulty when attempting the interconnecting of elements while the collar is around a dog's neck, particularly if the dog is at an early stage of training, given the snug fit required for proper use and that the dog may resist application of the collar to its neck by shaking its head and trying to pull away.

Thus, the need exists for a collar that address all of the drawbacks of a traditional Pinch collar, that is easy to attach to a dog's neck, this easy to assemble and connect and has an attractive outward appearance.

Thus, the need exists for a way to improve upon features of training collars that more effectively create lasting change in the dog's behavior.

SUMMARY OF THE INVENTION

A dog training collar includes a plurality of releasable interconnecting links connected together to form a string of links having opposite ends with a tensioning member connected between the opposite ends of the link string to form a collar. A releasable fastener is included that releasably connects between the tensioning member and at least one of the opposite ends of the link string. The interconnecting links each include an inner side and outer side where the inner side includes a pair of v-shaped protrusions extending away from the inner side. The string of links having a plurality of v-shaped protrusion pairs forms two columns of links arranged in spaced apart relation extending from the inner sides, whereby the string of links is placed around a neck of a dog with said v-shaped protrusions directed toward the neck and connected to said tensioning member by the releasable fastener to form said collar such that adjustment of said tensioning member during wear causes a physical correction to be applied to the neck.

The number of links used may be adjusted according a dog's neck size.

An anti-tangling device is coupled to the tensioning member whereby the anti-tangling device restores unintended twists in the collar when applied to the neck of the dog.

Each of the links includes a first end and a second end connected by a thickened body frame that supports two spaced apart v-shaped protrusions extending from opposing body frame sides and away from the inner side between the first and second end.

The first end of each link includes two arms extending away from the body frame and each arm includes an enlarged rounded free end to support a load of a metal pin. A metal pin connector that extends between the enlarged rounded free ends and is connected by friction fit to the free ends through apertures centrally located in the enlarged rounded free ends of the arms.

The second end of each link includes a hook projection to receive a pin of a complementary first end of another link. The projection includes ribs in spaced apart relation to each other extending about an outer circumference surface of the projection such that the ribs extend about an outer circumference of the hook.

Opposite ends of the string of links each includes end links to facilitate connection to the tensioning member and releasable fastener. Each of the end links includes at least one of a first end and a second end connected to a thickened body frame that supports two spaced apart v-shaped protrusions extending from opposing body frame sides and away from said inner side between the first and second end. Each of the end links further includes a tensioning member interface connected to said thickened body frame and opposite the at least one of a first end and a second end.

BRIEF DESCRIPTION OF THE DRAWINGS

Other aspects, advantages and novel features of the invention will become more apparent from the following detailed description of the invention when considered in conjunction with the accompanying drawings wherein.

DETAILED DESCRIPTION

With reference to the drawings for purposes of illustration, the present invention is embodied in a dog-training collar 20 (FIG. 1) that includes features to improve dog training to effectively create lasting change in the dog's behavior. A brief examination of a dog's initial societal influences from the time of its birth is with its mother. Along with her physical and emotional comfort she gives her pups, she uses physical correction to gain control and respect from them. Following this same process the present invention uses physical correction by applying a variable amount of physical correction to a dog's neck through the collar's constrictive ability and v-shaped corrective protrusions. Each link 22 of the collar has two v-shaped protrusions 24 and 26 that rest upon the dog's neck when no force is applied. As force is applied via pulling of a leash connected to a tensioning member 28, the v-shaped protrusions 24 and 26 (or teeth) nip at the dog's neck to get its attention and keep it focused. This is similar to a type of correction the dog's mother may have used to obtain corrective behavior. To perform this function, the collar of the present invention includes a plurality of interconnecting links 22, each having two v-shaped protrusions 24 and 26 and each link 22 hingedly interconnected to each other about a hinge pin 30, where the plurality of links 22 forms a string 32 of links that connects at opposite ends to a tensioning member 28 to form a circular collar sized by the addition or subtraction of sufficient links 22 to snugly fit about the circumference of a dog's neck. The tensioning member 28 includes a leash connector ring 34 that operates to constrain the circumference of the collar in response to sufficient forces between the collar 20 and the leash (not shown). Advantageously, the collar includes a releasable fastener 35 releasably coupling the tensioning member 28 to at least one end of the string 32 of links and an anti-tangling device 36 to prevent and/or undo undesired twisting of the collar 20. Furthermore, the outside of the collar is sized and shaped to mask or hide the corrective function of the collar.

Figure 1:
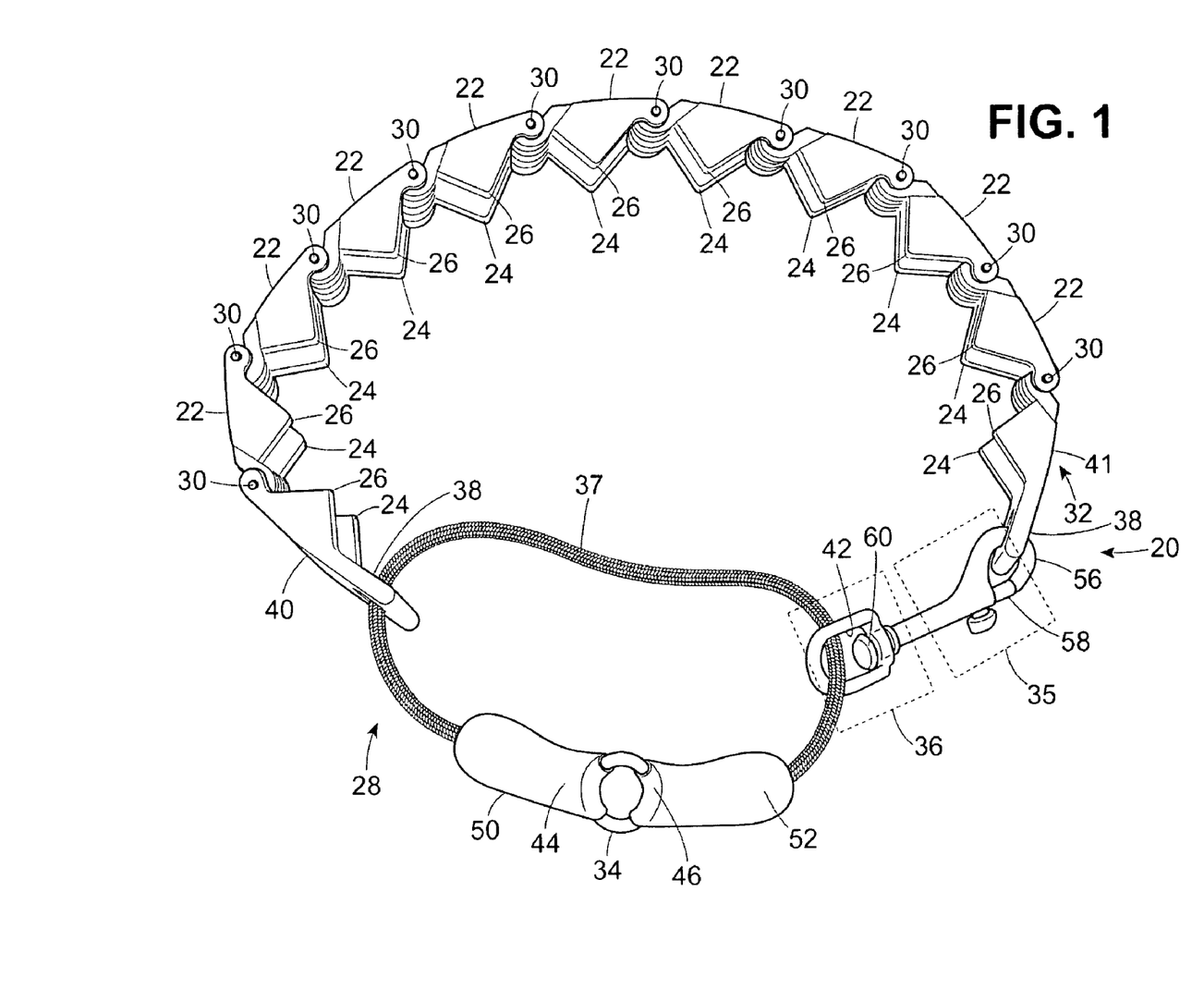
FIG. 1 is a perspective view of a dog training collar according to the present invention.

In a presently preferred embodiment, the tensioning member 28 is made from a loop of cable such as, but not limited to, nylon rope 32 that is threadably received through an aperture 38 in at least one end link 40 and 41 of the link string and an aperture 42 provided in the anti-tangling device 36. It will be appreciated that wire rope or other material for holding such loads as experienced between a dog and a trainer may be used. For purposes of this preferred embodiment the tensioning member 28 may also be referred to as a constrictive rope. The preferred loop of rope is formed from a strand that includes free ends 44 and 46 connected to the leash connector ring 34. The ring 34 is preferably sufficiently sturdy so as not to deform under forces exerted between the dog and a trainer while undergoing training and may be made from metal or other hardened materials, but is preferably chrome coated steel. The ring 34 is sized to permit a leash fastener (not shown) to be coupled thereto as well as to allow for a human finger to grasp it, if the collar constraining feature is required and the leash is not available. To further permit maximum space in the interior of the ring 34, the nylon rope free ends 44 and 46 connect to the ring via a web fabric strip 50 and 52 that wraps around and contours the ring with free ends wrapped around the rope end and anchored to the rope via stitching of sufficient strength to withstand the forces exerted between a person and a dog.

In a preferred embodiment, the anti-tangling device 36 and releasable fastener 35 are combined in a single device. A device of the type suitable for this purpose is a swivel snap hook having the closed aperture 42 connected to a hook 56 having a spring biased latch 58 that "snaps" closed via a pivot 60 that swivels. The cable of the tensioning member 28 slides through the closed aperture 42 and the hook 56 releasably couples to an aperture 61 of end link 40 or 41 of the link string 32. Such a swivel snap hook would need to be constructed of material sufficient to withstand the forces exerted between a person and dog. Presently, chrome coated steel is preferred. It will be appreciated by those skilled in the art that other configurations such as separating the anti-tangling device and the releasable fastener in spaced apart configurations are possible. Furthermore the anti-tangling device function may be provided by any conventional apparatus for swiveling ends to untangle them. Similarly, any conventional releasable fastener may be used to couple the tensioning member to a link string free end.

Figure 2:
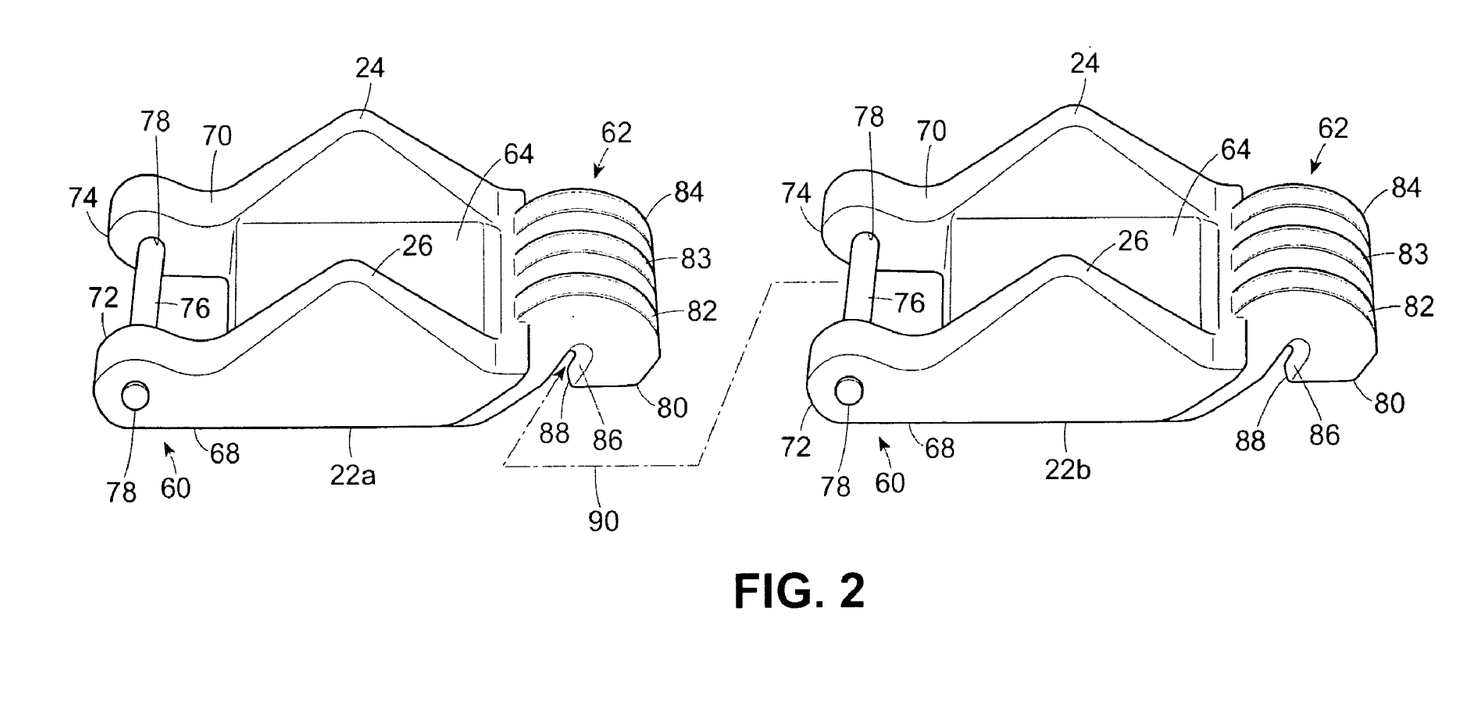
FIG. 2 is an exploded perspective view of interconnecting links according to the present invention.

With reference to FIG. 2, each interconnecting link 22a includes a first end 60 and a second end 62 connected by a thickened body frame 64 that supports two spaced apart v-shaped protrusions 24 and 26 extending from opposing body frame sides 64 and 66 between the first and second end 60 and 62. The v-shaped protrusions 24 and 26 that will lie against the dog's neck to offer corrective motivation. The first end 60 of each link 22 includes two arms 68 and 70 extending away from the body frame 64 and each arm 68 and 70 includes an enlarged rounded free end 72 and 74 to support the load of a metal pin connector 76 that extends between the enlarged free ends and connects by friction fit to the free ends 72 and 74 through apertures 78 centrally located in the enlarged free ends of the arms.

The second end 62 of each link 22a includes a hook projection 80 to receive the pin 76 of a complementary first end 60 of another link 22b. Ribs 82-84 in spaced apart relation to each other enhance the outer circumference formed by the hook 80 such that the ribs 82-84 extend about the circumference of the hook. The ribs provide three functions in that the ribs (1) enhance the strength of hook to secure the pin when under the load of pulling animal, (2) provide a decorative enhancement to the overall look of the collar and (3) the spaced areas provide additional ventilation to exchange heat trapped between the animal's neck and the collar. The hook 80 has a width to pass through the arms 68 and 70 of the first end and provides a channel 86 through which the pin 76 of the first end may pass and is hingedly attached. The entrance 88 of the channel 86 is slightly narrower to prevent unintended withdrawal of the pin 76 from the channel 86. Directing the pin 76 in the direction shown by arrow 90, the pin 76 is manually "snap fit" through the entrance 88 of the channel 86 by a user and secured in the channel 86 for use around the animal's neck. Thus, a collar may be formed by the attachment of the interconnecting links 22 when arranged to laying end to end, which then forms a string 32 of connected links as shown in FIG. 1.

Figure 3:
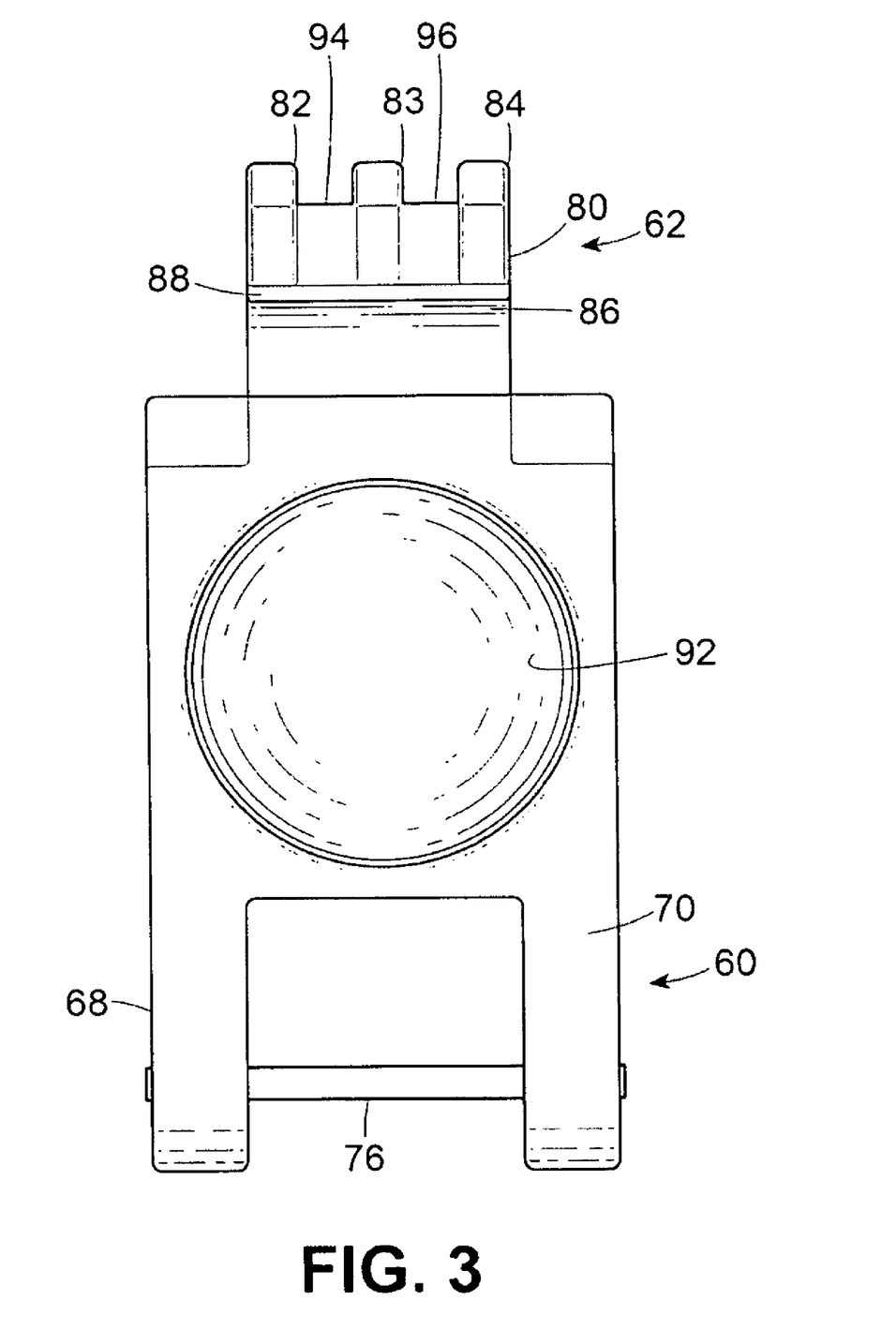
FIG. 3 is a top plan view of an interconnecting link according to the present invention.

With reference to FIG. 3, a single link 22 from a top view includes a concave dimple 92, which provides a finger grip in the top of the link and by orientation and duplicity a decorative enhancement to the collar. This finger grip or dimple 92 assists the user by enabling the user to better grip the links to be able to attach or detach them from each other. The concave design also adds a positive aesthetic look to the overall collar's appearance. Furthermore, the air ventilation through gaps 94 and 96 provided by the spacing of the ribs is more clearly shown.

Figure 4:
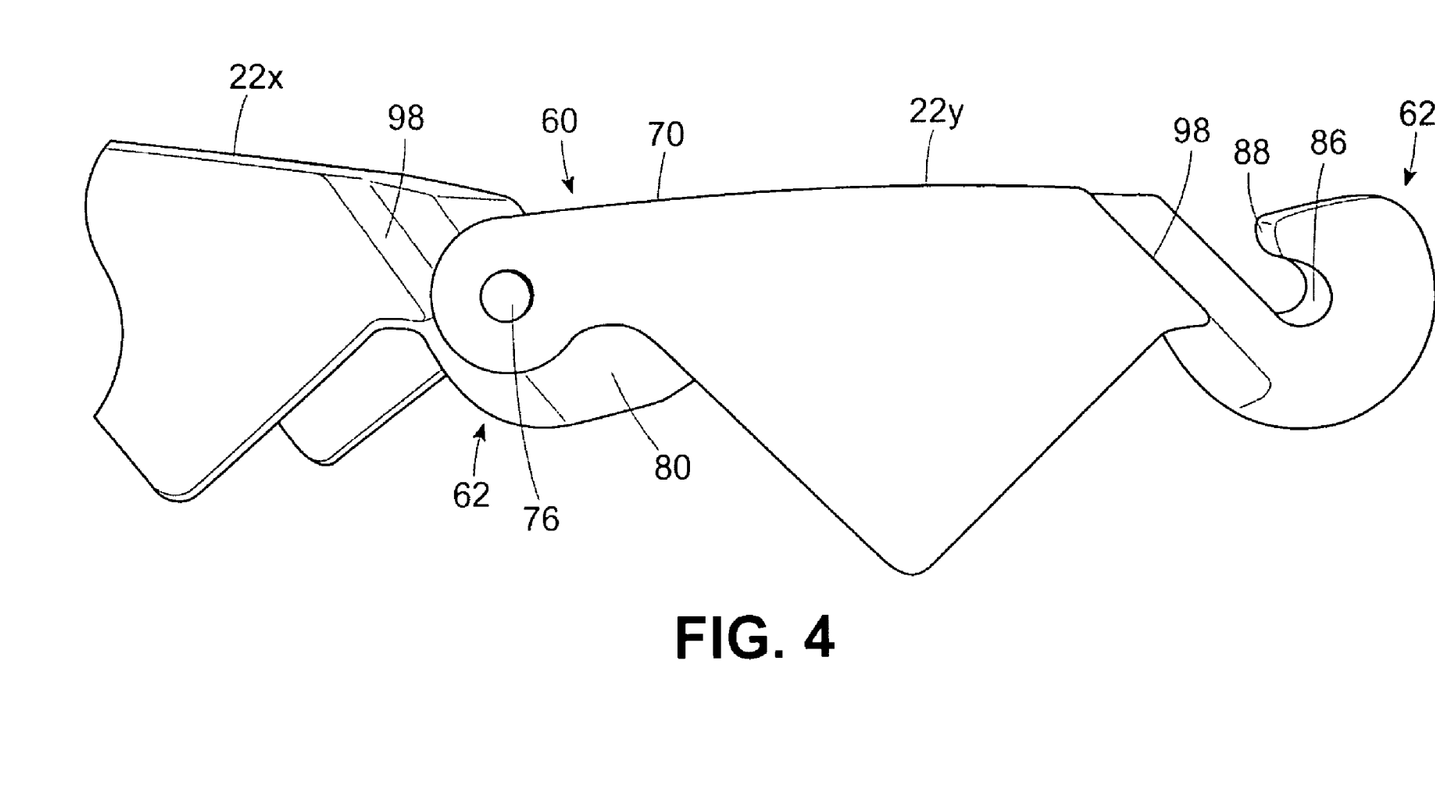
FIG. 4 is a side perspective view of a partial link interconnected to another link according to the present invention.

With reference to FIG. 4, a pair of links 22x and 22y connected by complementary first and second ends 60 and 62 in a generally co-planar position has a range of rotational motion greater than 90 degrees in either direction. This range of motion provides for compactness when storing the collar and provides for a greater ranges in supporting animals' necks of different sizes. Furthermore the extend range of motion allows for a stop 98 to be fashioned proximate the hook 80 with a greater surface area to stop further rotation of the pin 76 about the hook 80. The increased surface area supports a greater surface of the arms supporting the pin 76 at the stop 98. Should the hinge experience an increased load from, for example, being stepped upon, such that the force is conveyed between the stop 98 and the arms 68 and 70, then a greater surface area of the arms will share the weight thus reducing the possibility of damage to the collar.

Figure 5:
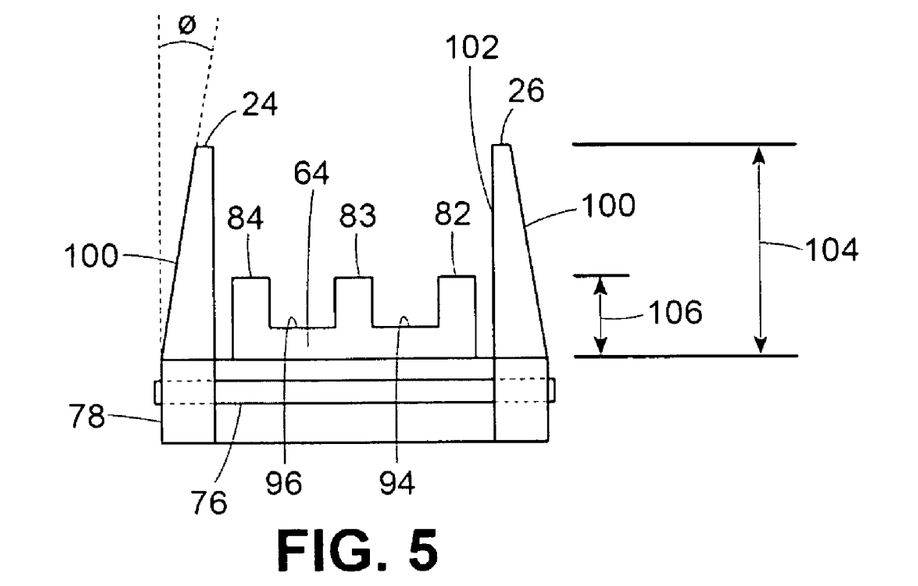
FIG. 5 is a front plan view of an interconnecting link according to the present invention.

With reference to FIG. 5, a side view of a link taken from a first end illustrates the configuration of the v-shaped protrusions 24 and 26 which are tapered from end to end as shown in FIG. 2, but also are tapered inwardly from the body frame 64 by the angle ø. The tapered thickness provides greater structural support to the protrusions 24 and 26 near the body frame and helps to prevent damage to the collar from unintended forces upon the protrusion such as being stepped upon, but also form a sloped surface 100 that more naturally follows the natural tapering of teeth, thus, more closely emulating the corrective feel of a mother's physical correction. Furthermore, it may be appreciated that the collar provides between the protrusions an air chamber 102, which also helps to reduce heat between the neck of the animal and the collar. The protrusions have a general height from the body frame proportional to a dog's incisor teeth. As will be described in greater detail below, there are two distance variations relevant to the collar and a dog's neck. First the distance 104 between the protrusions and the body frame 64, which provides an air gap for air circulation, and the distance 106 between the extension 108 of the ribs of the hook above the body frame 64.

Figure 6:
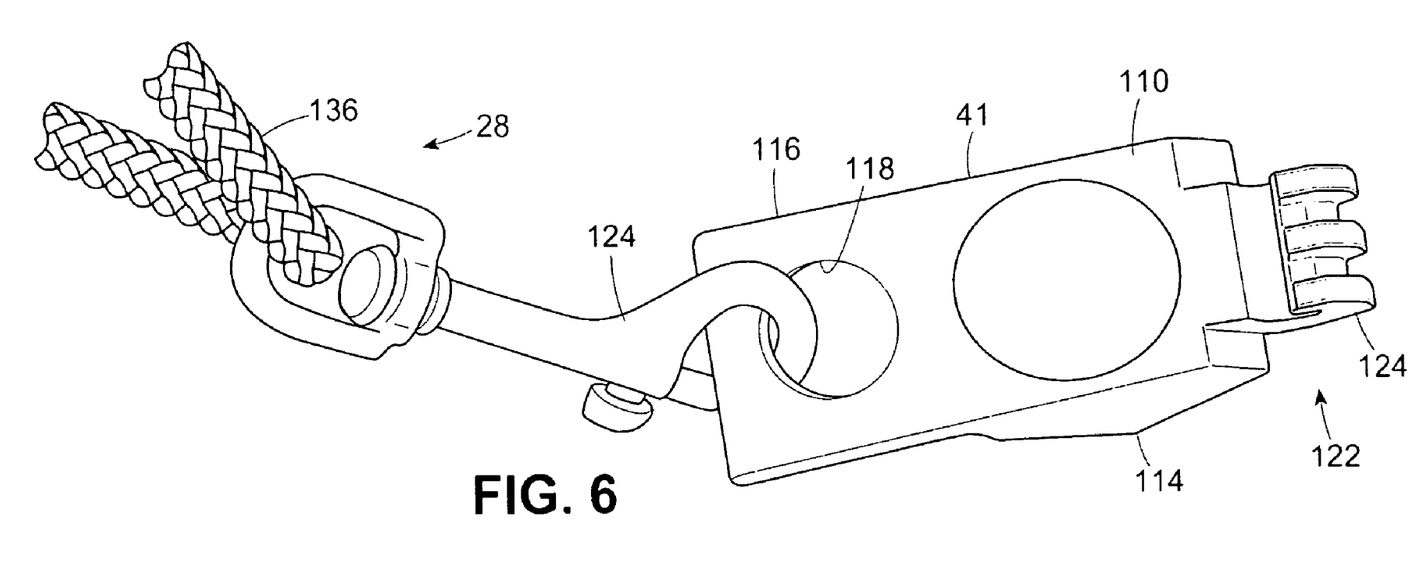
FIG. 6 is a top perspective view of an end link releasably coupled to an anti-tangle fastener according to the present invention.
Figure 7:
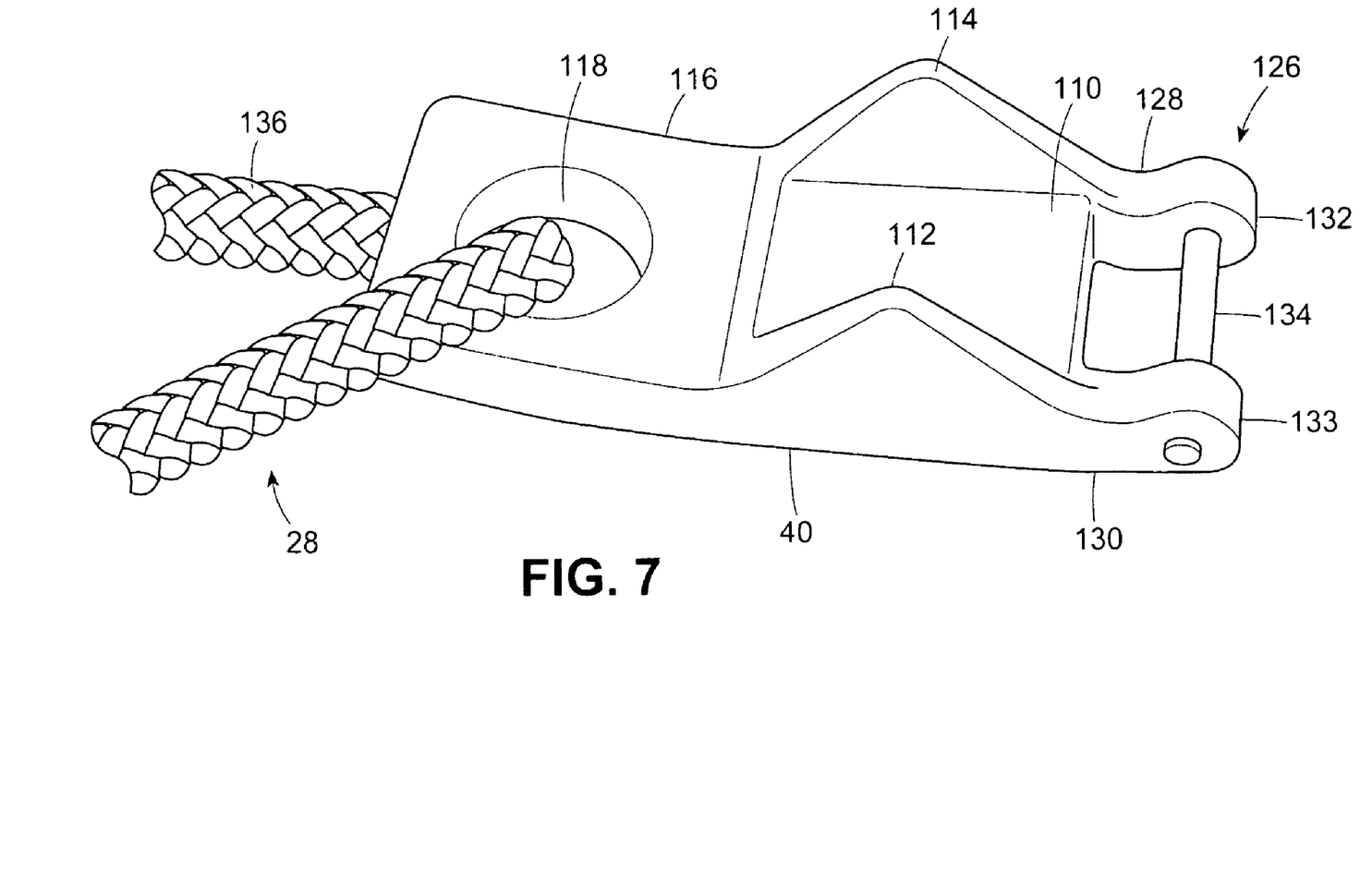
FIG. 7 is a bottom perspective view of an end link coupled tensioning cable according to the present invention.

With reference to FIGS. 6 and 7, each string of interconnecting links terminates with end links 40 and 41 configured to connect the string 32 of links to the tensioning member. Each end link has a thickened body frame 110 from which two spaced apart v-shaped protrusions 112 and 114 project and an elongated tensioning member interface 116 having an aperture 118 for coupling to the tensioning member 28 and an elongated concave dimple 120 that easily distinguishes the end links 40 and 41 from interconnecting links 22 and provide an improved finger grip. Each pair of end links includes one end that is complementary to either the first end or second of the interconnecting links thus ensuring that in a string of links each end terminates with an end link having a tensioning member interface 116. For purposes of illustration and not by way of limitation, an end link 41 having a second end 122 with a ribbed hook 124 is illustrated in FIG. 6 connected to the swivel snap hook 124, which is received in the aperture 118 of the end link 41. Similarly, in FIG. 7, a complementary end link 40 having a first end 126 with arms 128 and 130 extending outward to form enlarged rounded ends 132-133 to support a pin 134 is connected to constrictive rope 136 forming the tensioning member 28. It will be appreciated by those skilled in the art that the end links 40 and 41 may be interchanged as to which end link is releasably attached or non-releasably attached to the tensioning member.

To put the collar on the dog or remove it, the quick release snap would be attached or detached from the hole in the end link. To use the collar, a dog leash would be attached to the ring of the tensioning member. During use any tension exerted through the leash between a person walking the dog and the dog causes the collar to constrict around the neck of the animal thereby causing a physical corrective force to the dog's neck.

Figure 8:
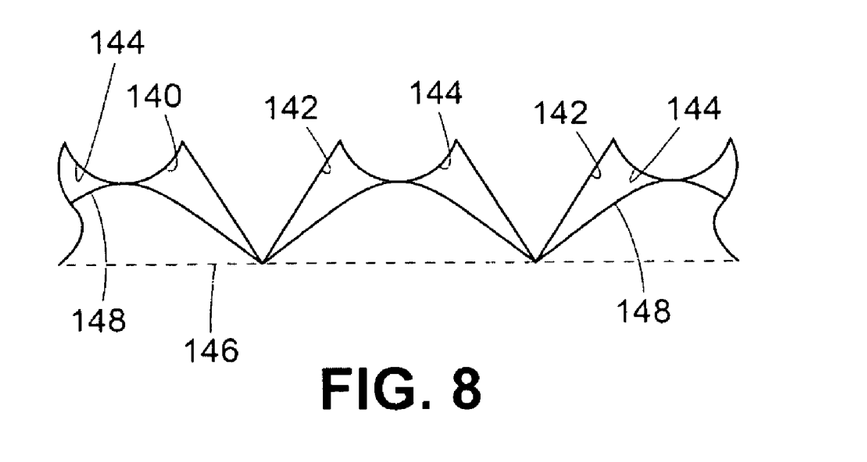
FIG. 8 is a diagrammatic view of a collar including interconnecting links contacting a dog's neck under tension and without tension according to the present invention.

With reference to FIG. 8, a portion of interconnecting links 140 is shown in outline with a plurality of protrusions 142 interspaced between rounded humps 144 formed by the outer surface of the ribs. Diagrammatically a dog's neck is shown by line 146 that represents the neck when there is no tension applied to the collar and a dog's neck. A dog's neck under tension is shown by line 148, where the spacing of the protrusions 142 in cooperation with the humps 144 formed by the ribs cause undulations (line 148) in neck skin of the dog. The spacing of the protrusions and ribs is believed to provide another feature that emulates the natural physical correction that puppies receive from their mother. The undulations further serve to stretch the neck skin so as to enhance the physical correction effect on the neck skin in a manner that avoids constraining the dog's neck so as to cause a choking effect.

Figure 9:
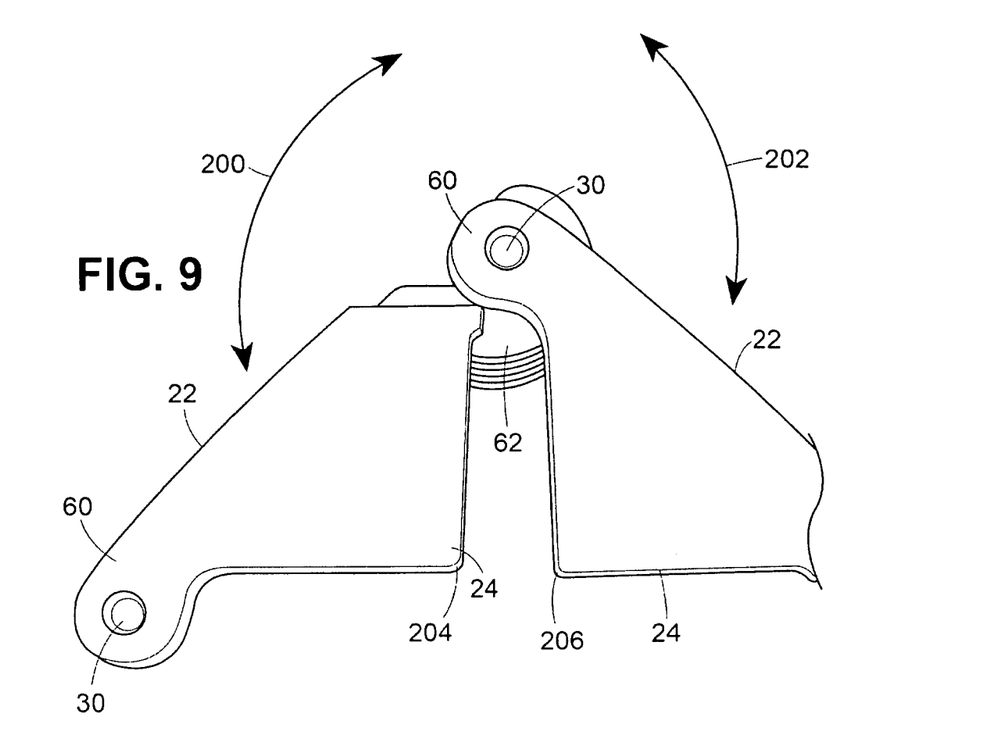
FIG. 9 is a side perspective view of a partial link interconnected to another link according to the present invention.
Figure 10:
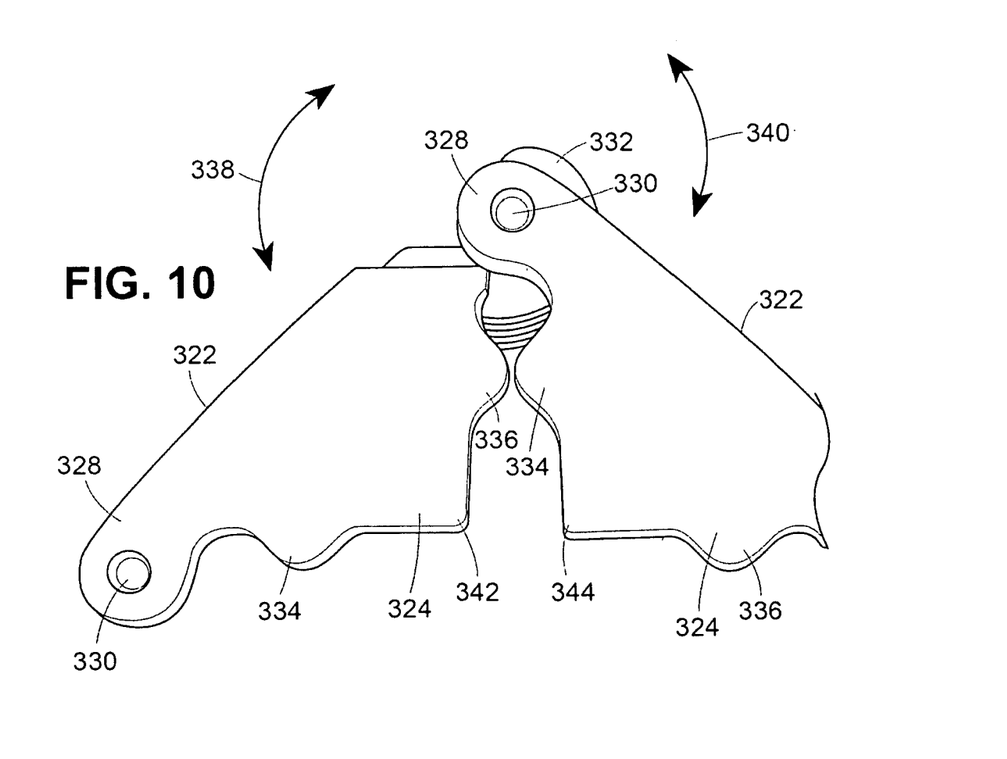
FIG. 10 is a side perspective view of partial link interconnected to another link according to an alternate embodiment of the present invention.
Figure 11:
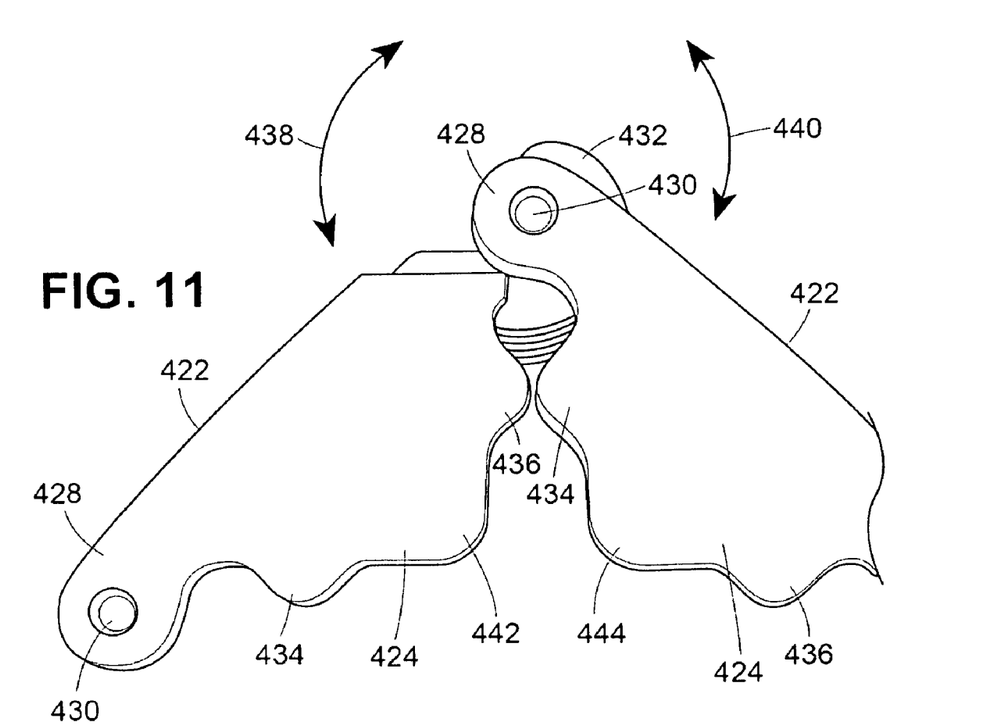
FIG. 11 is a side perspective view of a partial link interconnected to another link according to an alternate embodiment of the present invention.

With reference to FIG. 9, it should be noted that in the presently preferred embodiment a rotational movement is created using two links 22 with protrusions 24 connected to form a hinge using the hook end 62 and complementary arm end 60 supporting hinge pin 30. Rotation about the hinge pin 30 as shown by arrows 200 and 202 allows for rotation of the protrusions in a contacting relationship at the tips 204 and 206. To prevent contacting of the tips, an alternate embodiment represented by two links 322 (FIG. 10) having protrusion 324 that are connected to form a hinge using the hook end 332 and complementary arm end 328 supporting hinge pin 330. Each of the protrusions further includes stops 334 and 336. Rotation about hinge pin 330 as shown by arrows 338 and 340 allows for rotation of complementary protrusions until the rotation is stopped by the contact of complementary stops 334 and 336 leaving the tips 342 and 344 of the protrusions 324 in spaced apart relation. This configuration can protect against pinching of the neck skin when the collar is used on a dog having a small diameter neck. Finally, with reference to FIG. 11, to prevent contacting of the protrusion tips and reduce irritation to dogs with sensitive skin, an alternate embodiment an alternate embodiment represented by two links 422 (FIG. 10) having protrusion 424 that are connected to form a hinge using the hook end 432 and complementary arm end 428 supporting hinge pin 430. Each of the protrusions further includes stops 434 and 436. Rotation about hinge pin 430 as shown by arrows 438 and 440 allows for rotation of complementary protrusions until the rotation is stopped by the contact of complementary stops 434 and 436 leaving the tips 442 and 444 of the protrusions 424 in spaced apart relation. This configuration can protect against pinching of the neck skin when the collar is used on a dog having a small diameter neck. Furthermore, the tips 442 and 444 of the protrusions have been round off to reduce irritation in dogs with sensitive while still providing appropriate physical correction. It will be appreciated that the rounded tips while illustrated in connection with the stops may be used in embodiments without the stops.

It will be appreciated that the removable links are much easier for people with weaker hands to attach or re-attach because of the flexible qualities of the plastic the links are made from. Preferably, the links are made from injection-molded plastic where a polymer of the type suitable for this purpose is 100% nylon with a suitable brand such as Super-Tuff Nylon sold by DuPont of Wilmington, Del., USA.

It will be appreciated that the decorative concave designs on the top or out side of the links creates continuity of visual appearance to aid the user in keeping the links connecting in the proper way.

Additionally, the preferred collar solves inadvertent twisting of the collar when placed around the neck of the dog by using an anti-tangling device, making it nearly impossible to twist the collar to an incorrect position, if the correctly sized collar is attached and detached from the dog by using the anti-tangling device, thereby making the present collar much safer in reducing the chance of accidently cutting off air supply to the dog.

Furthermore, the collar's releasable fastener reduces wear on the interconnecting links so that once the collar is initially sized for the dog, the interconnecting links themselves do not have to be attached or detached from each other to put the collar on the dog. By simply connecting or disconnecting the releasable fastener from the hole in the link end, the collar is removed or attached easily by the average person. This reduces the risk that repeated removal and attachment of the links together would wear out the narrower entrance to the channel that forms the hook.

It will be appreciated that as far as adjusting sizing of the collar, in comparison to the standard metal choke chain collar with must be purchase in one size and cannot be effectively used between different dogs of different sizes, the present collar can be increased or decreased in size by adding or removing links. This is also helpful when training with a puppy that is growing rapidly, thereby eliminating the need to purchase multiple collars as the puppy grows.

The present collar solves the problem of social stigma caused by traditional corrective collars because it is a softer looking and more attractive collar due to its plastic content and decorative exterior.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. A dog training collar comprising:
    a plurality of releasable interconnecting links connected together to form a string of links having opposite ends;
    a tensioning member connected between said opposite ends of said link string to form a collar;
    a releasable fastener releasably connected between said tensioning member and at least one of said opposite ends of said link string;
    said interconnecting links each include an inner side and outer side where said inner side includes:
    a pair of spaced apart v-shaped protrusions linked only at their respective lower distal ends by a thickened body frame of the interconnecting links with no other physical connection between the pair of spaced apart v-shaped protrusions from their respective vertex that define an apex of the pair of spaced apart v-shaped protrusions to the thickened body frame, forming a void space in between the pair of spaced apart v-shaped protrusions;
    whereby said string of links is placed around a neck of a dog with said v-shaped protrusions directed toward the neck and connected to said tensioning member by said releasable fastener to form said collar such that adjustment of said tensioning member when worn causes a physical correction to be applied to the neck.

2. The collar of claim 1 wherein said plurality of releasable interconnecting links may be adjusted by a quantity of interconnect links depending upon a neck size of the dog.

3. The collar of claim 2 in an instance where the neck size of the dog changes, said quantity of interconnecting links is adjusted to correspond to the new neck size.

4. The collar of claim 1 including an anti-tangling device coupled to said tensioning member whereby said anti-tangling device restores unintended twists in said collar when applied to the neck of the dog.

5. The collar of claim 1 wherein said anti-tangling device and releasable fastener are formed integrally.

6. The collar of claim 5 wherein said anti-tangling device and said releasable fastener are a swivel snap hook.

7. The collar of claim 1 wherein said tensioning member includes a ring and a loop of rope moveably connected to releasable fastener and at least one end of said link string, said rope having ends connected to said ring such that a pulling force applied to said causes tension to be transferred between said ring, said releasable fastener and said at least one end of said link string which applies a force attracting said at least one end to said releasable fastener through said rope to create said physical correction.

8. The collar of claim 1 wherein each of said links includes a first end and a second end connected by the thickened body frame that supports two spaced apart v-shaped protrusions extending from opposing body frame sides and away from said inner side between the first and second end.

9. The collar of claim 8 wherein said first end of each link includes two arms extending away from the body frame and each arm includes an enlarged rounded free end to support a load of a metal pin; and
    a metal pin connector that extends between the enlarged rounded free ends and connects by friction fit to the free ends through apertures centrally located in the enlarged rounded free ends of the arms.

10. The collar of claim 9 wherein said second end of each link includes a hook projection to receive a pin of a complementary first end of another link; and said projection having ribs in spaced apart relation to each other extending about an outer circumference surface of said projection such that the ribs extend about an outer circumference of the hook.

11. The collar of claim 10 wherein said hook projection has a width to pass slidably between through said arms of said first end and includes a channel through which said pin of the first end may pass and when in said channel forms a hinge.

12. The collar of claim 11 wherein an entrance portion of said channel is slightly narrower to prevent unintended withdrawal of the pin from the channel.

13. The collar of claim 11 wherein said hinge permits rotation of said links about said pin and said protrusions include stops to prevent contacting of protrusion tips during rotation.

14. The collar of claim 9 wherein said link is formed from injection molded plastic and said pin is formed from steel.

15. The collar of claim 8 wherein said opposite ends of said string of links each includes end links to facilitate connection to said tensioning member and releasable fastener.

16. The collar of claim 15 wherein each of said end links includes at least one of a first end and a second end connected to an end link thickened body frame that supports two spaced apart v-shaped protrusions extending from opposing body frame sides and away from said inner side between the first and second end.

17. The collar of claim 16 wherein each of said end links further includes a tensioning member interface connected to said thickened body frame and opposite said at least one of a first end and a second end.

18. The collar of claim 17 wherein said tensioning member interface includes an elongated surface having an aperture to connect there through at least one of said tensioning member and said releasable fastener.

19. The collar of claim 18 wherein said outer surface of said end links includes an elongated oval shaped indentation such that a thumb grip is formed to aid in interconnecting links and connection of said collar around a neck of a dog.

20. The collar of claim 1 wherein said outer side of said link includes a concave indentation such that a thumb grip is formed to aid in interconnecting links.

21. The collar of claim 1 wherein said protrusions include rounded tips.

22. A dog training collar comprising:
a plurality of releasable interconnecting links connected together to form a string of links having opposite ends;
a tensioning member connected between said opposite ends of said link string to form a collar;
a releasable fastener releasably connected between said tensioning member and at least one of said opposite ends of said link string;
said interconnecting links each include an inner side and outer side where said inner side includes a pair of v-shaped protrusions extending away from said inner side;
said string of links having a plurality of v-shaped protrusion pairs forms two columns of links arranged in spaced apart relation extending from said inner sides;
the pair of v-shaped protrusions are linked only at their respective lower distal ends by a thickened body frame of the interconnecting links with no other physical connection between the pair of v-shaped protrusions from their respective vertex that define an apex of the pair of v-shaped protrusions to the thickened body frame, forming a void space in between the pair of v-shaped protrusions;
whereby said string of links is placed around a neck of a dog with said v-shaped protrusions directed toward the neck and connected to said tensioning member by said releasable fastener to form said collar such that adjustment of said tensioning member during wear causes a physical correction to be applied to the neck;
wherein said plurality of releasable interconnecting links may be adjusted by a quantity of interconnect links depending upon a neck size of the dog;
wherein in an instance where the neck size of the dog changes, said quantity of interconnecting links is adjusted to correspond to the new neck size;
an anti-tangling device coupled to said tensioning member whereby said anti-tangling device restores unintended twists in said collar when applied to the neck of the dog;
wherein said tensioning member includes a ring and a loop of rope moveably connected to said releasable fastener and at least one end of said link string, said rope having ends connected to said ring such that a pulling force applied to said causes tension to be transferred between said ring, said releasable fastener and said at least one end of said link string which applies a force attracting said at least one end to said releasable fastener through said rope to create said physical correction;
wherein each of said links includes a first end and a second end connected by the thickened body frame that supports two spaced apart v-shaped protrusions extending from opposing body frame sides and away from said inner side between the first and second end;
wherein said first end of each link includes two arms extending away from the body frame and each arm includes an enlarged rounded free end to support a load of a metal pin;
a metal pin connector that extends between the enlarged rounded free ends and connects by friction fit to the free ends through apertures centrally located in the enlarged rounded free ends of the arms;
wherein said second end of each link includes a hook projection to receive a pin of a complementary first end of another link;
said projection having ribs in spaced apart relation to each other extending about an outer circumference surface of said projection such that the ribs extend about an outer circumference of the hook;
wherein said hook projection has a width to pass slidably between through said arms of said first end and includes a channel through which said pin of the first end may pass and when in said channel forms a hinge;
wherein an entrance portion of said channel is slightly narrower to prevent unintended withdrawal of the pin from the channel;
wherein said link is formed from injection molded plastic and said pin is formed from steel;
wherein said outer side of said link includes a concave indentation such that a thumb grip is formed to aid in interconnecting links;
wherein said opposite ends of said string of links each includes end links to facilitate connection to said tensioning member and releasable fastener;
wherein each of said end links includes at least one of a first end and a second end connected to an end link thickened body frame that supports two spaced apart v-shaped protrusions extending from opposing body frame sides and away from said inner side between the first and second end;

wherein each of said end links further includes a tensioning member interface connected to said thickened body frame and opposite said at least one of a first end and a second end;
wherein said tensioning member interface includes an elongated surface having an aperture to connect there through at least one of said tensioning member and said releasable fastener; and
wherein said outer surface of said end links includes an elongated oval shaped indentation such that a thumb grip is formed to aid in interconnecting links and connection of said collar around a neck of a dog.

* * * * *